United States Patent
Inaba

(10) Patent No.: US 6,557,286 B1
(45) Date of Patent: *May 6, 2003

(54) STEREO SLIDE MOUNT

(76) Inventor: Minoru Inaba, No. 1116, Oaza Samukawa, Oyama-shi, Tochigi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/593,899

(22) Filed: Jun. 14, 2000

Related U.S. Application Data

(63) Continuation of application No. 08/851,257, filed on May 5, 1997, now Pat. No. 6,105,296.

(51) Int. Cl.⁷ .................................................. A47G 1/06
(52) U.S. Cl. .............................. 40/707; 40/701; 40/705; 40/362; 40/366
(58) Field of Search .................... 40/701, 703, 704, 40/705, 707, 649, 362, 366, 367, 618, 6, 634, 325, 330, 359, 491; 353/120; 359/477

(56) References Cited

U.S. PATENT DOCUMENTS

| | | | |
|---|---|---|---|
| 1,266,142 A | 5/1918 | Motsch | 40/649 X |
| 1,445,290 A | 2/1923 | Buck | 40/362 |
| 1,714,421 A * | 5/1929 | Goldworthy | 40/634 |
| 1,795,291 A * | 3/1931 | Dunn | 40/634 X |
| 2,292,312 A | 8/1942 | Wittel et al. | 40/707 |
| 2,349,013 A * | 5/1944 | Sparling | 359/477 |
| 2,449,727 A | 9/1948 | Sloane | 40/649 |
| 2,540,718 A | 2/1951 | Duskin | 40/618 X |
| 2,624,139 A * | 1/1953 | Kottke | 40/634 |
| 2,713,015 A | 7/1955 | Paulsohn | 40/649 X |
| 2,739,401 A | 3/1956 | Balter | 40/705 X |
| 2,823,478 A | 2/1958 | Östergaard et al. | 40/707 |
| 2,842,883 A | 7/1958 | Folwell et al. | 40/705 X |
| 3,133,368 A | 5/1964 | Perrot | 40/707 |
| 3,235,991 A | 2/1966 | Harper et al. | 40/707 X |
| 3,242,605 A | 3/1966 | Kleinschmidt | 40/705 |
| 3,325,932 A | 6/1967 | Selinsky | 40/701 |
| 3,389,485 A | 6/1968 | Roubal | 40/705 |
| 3,808,722 A | 5/1974 | Byers | 40/705 |
| 4,031,640 A | 6/1977 | Hanna, Jr. et al. | 40/703 X |
| 4,104,818 A | 8/1978 | Hrabik | 40/707 |
| 4,132,480 A | 1/1979 | Reed | 40/701 X |
| 4,314,416 A | 2/1982 | Lorsch | 40/701 |
| 4,431,282 A | 2/1984 | Martin geb. Böser | |
| 4,530,570 A | 7/1985 | Vitrac | 40/366 X |
| 5,392,548 A | 2/1995 | Truc et al. | |
| 5,607,186 A * | 3/1997 | Schroeder et al. | 40/491 X |
| 5,685,626 A | 11/1997 | Inaba | 40/705 X |
| 6,105,296 A * | 8/2000 | Inaba | 40/707 |

FOREIGN PATENT DOCUMENTS

DE        735 238        4/1943

* cited by examiner

Primary Examiner—Robert J. Sandy
Assistant Examiner—Andrea Chop
(74) Attorney, Agent, or Firm—Fattibene & Fattibene; Paul A. Fattibene; Arthur T. Fattibene

(57) ABSTRACT

A stereo slide mount system that can reproduce an accurate stereo effect to facilitate a mounting operation and accurate positioning. The stereo slide mount has curved lateral ends facilitation insertion in a slide mount holder. A set of plural types of stereo slide mounts 1 (#0 to #n) in which the width W of windows step wisely decreases with each mount having the same window pitch Pw and different window widths W. A base frame is provided with positioning pins for engaging perforations on the film, and a cover frame is provided with pin holes to be engaged with the positioning pins. The positioning pins and the pin holes are provided at positions such that the inner vertical edges of the windows are brought into agreement with the inner edges of the pictures of the film. The stereo slide mount having smaller width windows has an increased gap width ($P_0$, $P_1$, $P_2$, ... ) between the two sets of right and left positioning pins so as to extend the pitch of the right and left films, and therefore the outer masking amount of the right and left films increases.

8 Claims, 12 Drawing Sheets

FIG. 2a
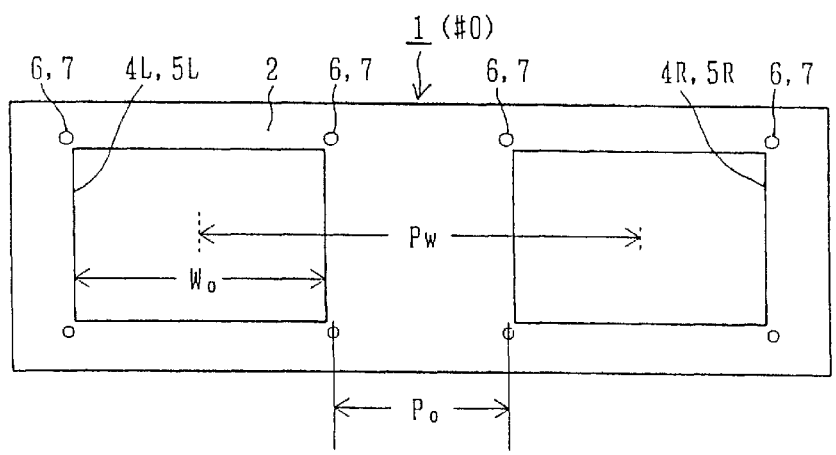
FIG. 2b
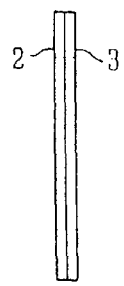
FIG. 2c
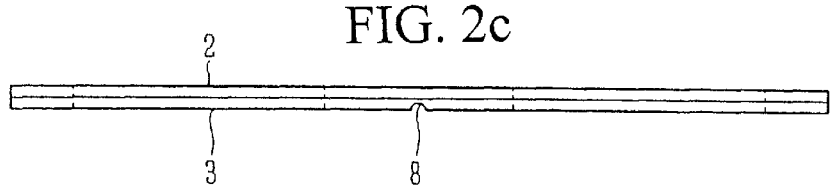
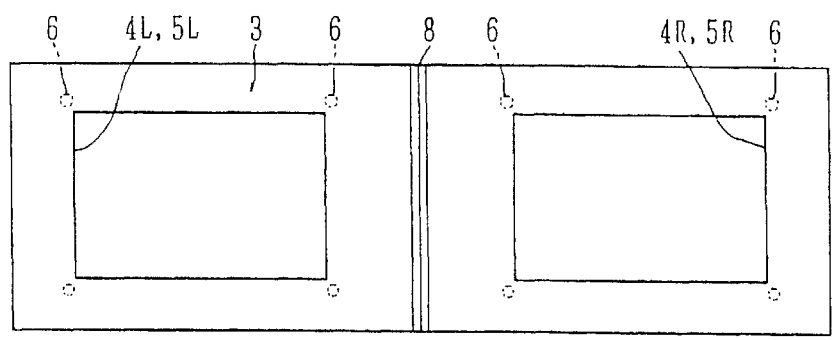
FIG. 2d

FIG. 3a
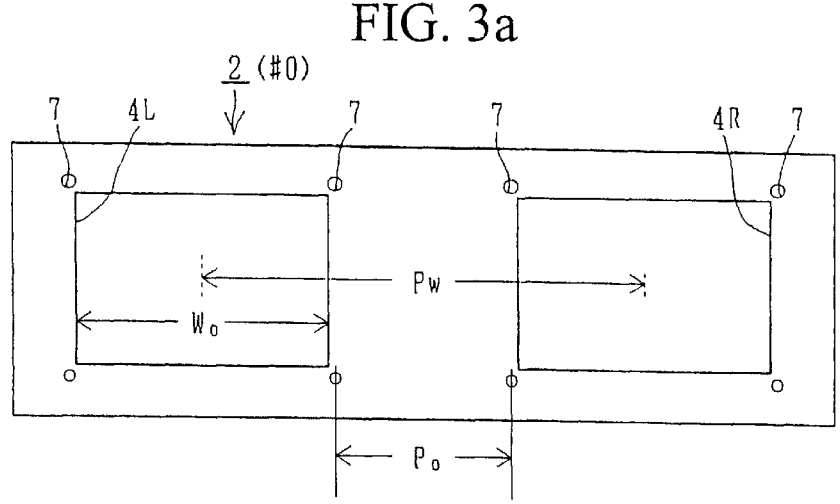
FIG. 3b
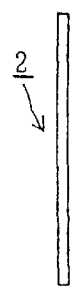
FIG. 3c
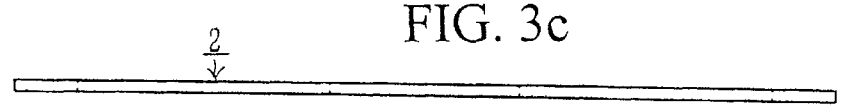
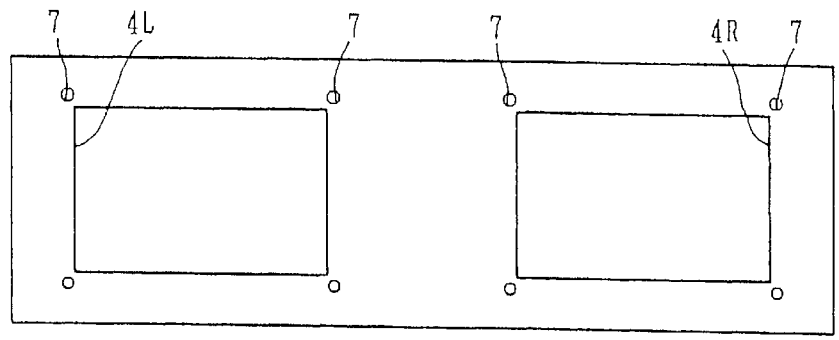
FIG. 3d

FIG. 4a
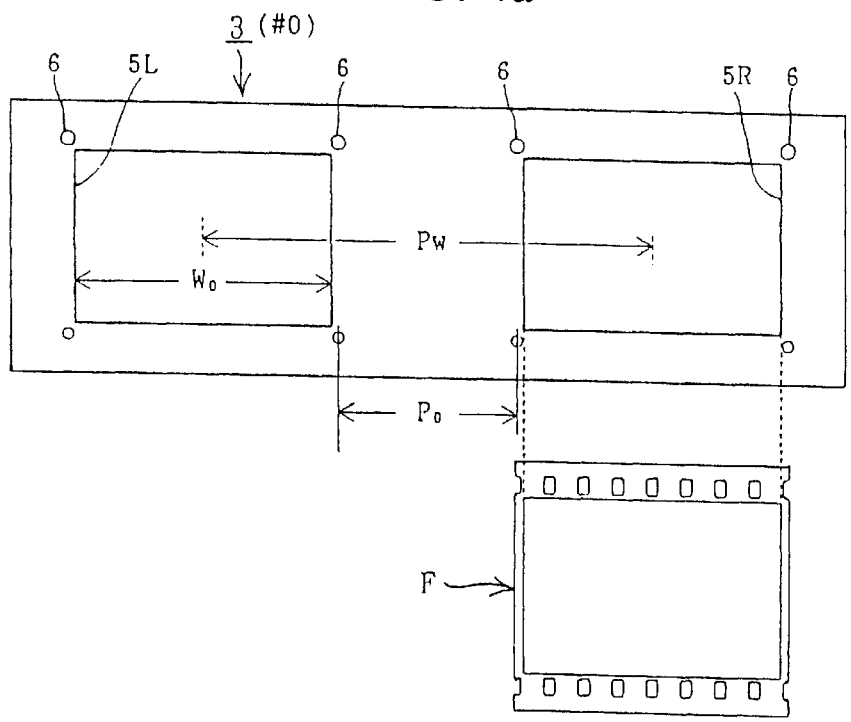
FIG. 4b
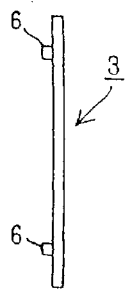
FIG. 4c
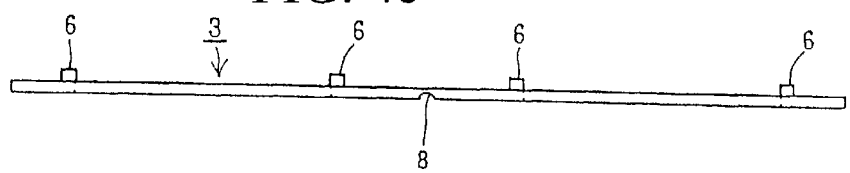
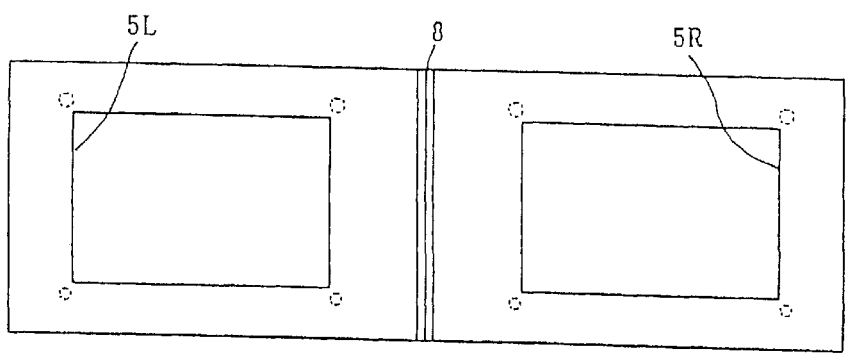
FIG. 4d

STEREO SLIDE MOUNT

RELATED APPLICATION

This application is a continuation of application Ser. No. 08/851,257 filed May 5, 1997, now U.S. Pat. No. 6,105,296.

FIELD OF THE INVENTION

The present invention relates to a stereo slide mount system. More specifically, the invention relates to a stereo slide mount system for providing an accurate and solid image by masking the outer sides of both right and left pictures.

BACKGROUND OF THE INVENTION

In a stereo slide photographed by a stereo camera in which the interval between the optical axes of the right and left lenses is fixed, non-overlapping portions, in which the photographic ranges of the right and left photographic pictures are not brought into agreement with each other, are formed due to a difference in the visual field of the right and left photographic lenses of the stereo camera. These non-overlapping portions do not contribute to forming a solid image when the slides are viewed by using a stereo slide viewer. When a stereo slide in which the non-overlapping portions are not masked is viewed by two eyes, the edges of the other windows appear as vertical lines along the boundaries between the overlapping portions and the non-overlapping portions to impair taste or visual appearance. Accordingly, to prevent this, the windows of the stereo slide mount have been formed in a width narrower than the size of the picture of the slide films so as to mask the non-overlapping portions.

The width of the non-overlapping portions to be masked increases as the photographing distance to a subject which most influences matching of the right and left pictures approaches. Therefore, there have been provided plural kinds of stereo slide mounts having step wisely different widths of windows. The stereo slide mount having a window of a suitable width for masking is selected from these stereo slide mounts to mount the slide film. However, it is not easy to judge the amount of masking required by viewing a pair of slide films after each frame is cut, and the problem arises that a stereo slide mount is frequently erroneously selected.

In obtaining a suitable stereo effect in the stereo slide, it is known that a subject which most influences matching of right and left images should be disposed in the same position relative to the right and left windows of the stereo slide mount. If the positions of the subject are different on the right and left, the natural stereo effect is impaired. However, a conventional stereo slide mount does not have any means of positioning the film in the right-to-left direction and it has the disadvantage that it is not easy to position the film in a suitable position.

The present applicant has previously proposed a stereo slide system in which a stereo slide photographed by a stereo camera having a predetermined positional relationship between the perforations of a film and a photographing picture is mounted on a stereo slide mount using a picture masking amount guide device/stereo slide viewer, to eliminate at least some of the disadvantages of a conventional stereo slide system (Japanese Patent Applicatilon No. 8-029177).

The stereo slide mount of such a stereo slide system is made up of a base frame which is provided with film positioning pins around the edges of both right and left windows, and a cover frame selected from several possible cover frames in which the gap widths between right and left windows are the same and the widths of the windows are step wisely different. The picture masking-amount guide device/stereo slide viewer can be used to choose a suitable masking amount by observing a solid image while varying the masking amount of the outer region of the picture of the stereo slide. After the masking amount is determined, the perforations of the film are engaged with the positioning pins of the base frame to position the film. Next the cover frame having the width of the window corresponding to the determined masking amount is selected, and joined to the base frame. Then, the film is positioned at a predetermined position, and the non-overlapping portions of the outer side of the right and left films are masked to obtain an accurate stereo effect.

The above-mentioned stereo slide mount can be accurately and easily positioned at the time of mounting as described above, but since the cover frames having different width windows have the same gap widths between the right and left windows, the pitch at the center between the right and left pictures is narrowed as the width of the windows is narrowed, and hence the optical angles of the two eyes become different depending upon the pitch of the pictures.

The change of the pitch of the right and left pictures is not always such a large problem when viewing stereo slides, but when various stereo slides having large differences of pitch of picture are frequently changed and viewed for a long time, the adaption of the eyes for the change of the optical angle slows down and the person viewing the stereo slides can feel discomfort or fatigue.

In order to easily mount and accurately position the stereo slide and to provide a stereo slide mount which allows easy viewing without causing fatigue, it becomes necessary to solve this technical problem. The object of the present invention is to address this technical problem.

SUMMARY OF THE INVENTION

Viewed from one aspect, the present invention provides a stereo slide mount system comprising plural types of stereo slide mounts for mounting stereo slides, photographed using a stereo camera, in which pairs of right and left photographed pictures of the stereo slides have a constant position relative to perforations of a perforated film, each said stereo slide mount comprising a base frame and a cover frame each having two rectangular windows arranged in parallel, positioning pins provided on the film-mounting surface of said base frame to bring the pictures on two pieces of slide film into agreement with the windows upon engagement of said positioning pins with perforations in a slide film that is to be fixed, and holes corresponding to said positioning pins formed in the film-holding surface of said cover frame, said positioning pins being fitted to said holes in use in order to join said base frame and said cover frame together, wherein across said plural types of stereo slide mounts the width of the windows gradually decreases relative to the width of the pictures on the film, right and left windows have a constant predetermined pitch, and said positioning pins and pin holes of said plural types of stereo slide mounts are positioned so that the inner vertical edges of the right and left windows are brought into agreement with the inner vertical edges of the pictures of the film, the outer shielding areas of the right and left slide film being adjustable according to the difference in the widths of the windows of said plural types of stereo slide mounts.

BRIEF DESCRIPTION OF THE DRAWINGS

FIGS. 1a–d illustrate stereo slide mounts in accordance with one embodiment of the present invention, wherein FIGS. 1a, 1b, 1c, and 1d are front views of stereo slide mounts in which the width of the windows incrementally vary or step wisely decreases;

FIGS. 2a–d illustrates a stereo slide mount as shown in FIG. 1a, wherein FIG. 2a is a front view, FIG. 2b is a side view, FIG. 2c is a bottom view, and FIG. 2d is a back view;

FIGS. 3a–d illustrates the cover frame of the stereo slide mount shown in FIG. 1a, wherein FIG. 3a is a front view, FIG. 3b is a side view, FIG. 3c is a bottom view, and FIG. 3d is a back view;

FIGS. 4a–d illustrates the base frame of the stereo slide mount shown in FIG. 1a, wherein FIG. 4a is a front view, FIG. 4b is a side view, FIG. 4c is a bottom view, and FIG. 4d is a back view;

DETAILED DESCRIPTION OF THE PREFERRED EMBODIMENTS

Figure 1A:
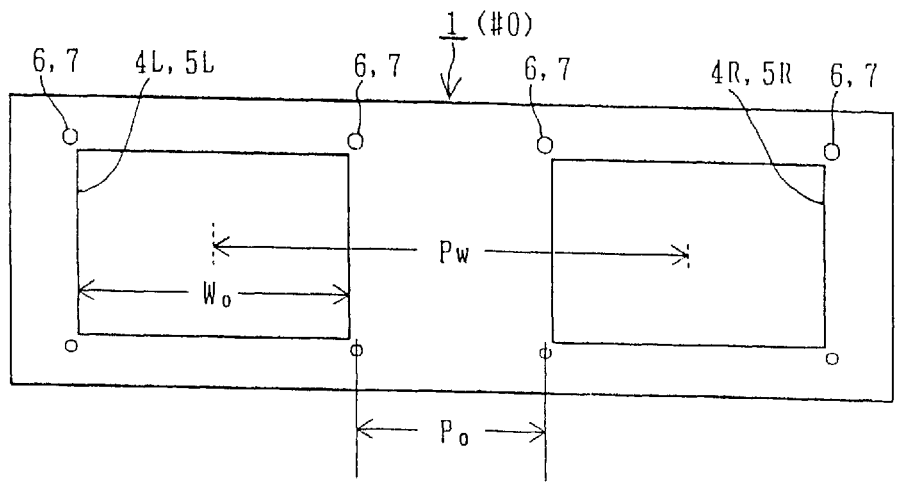
Figure 1B:
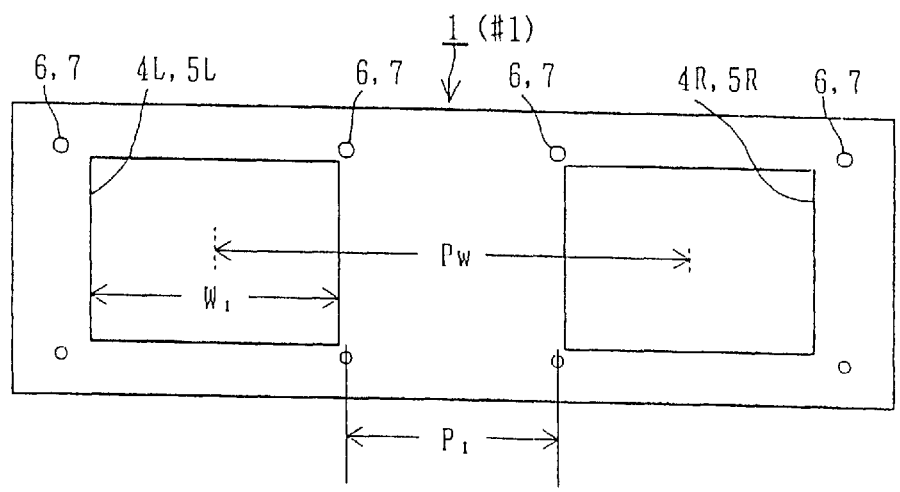
Figure 1C:
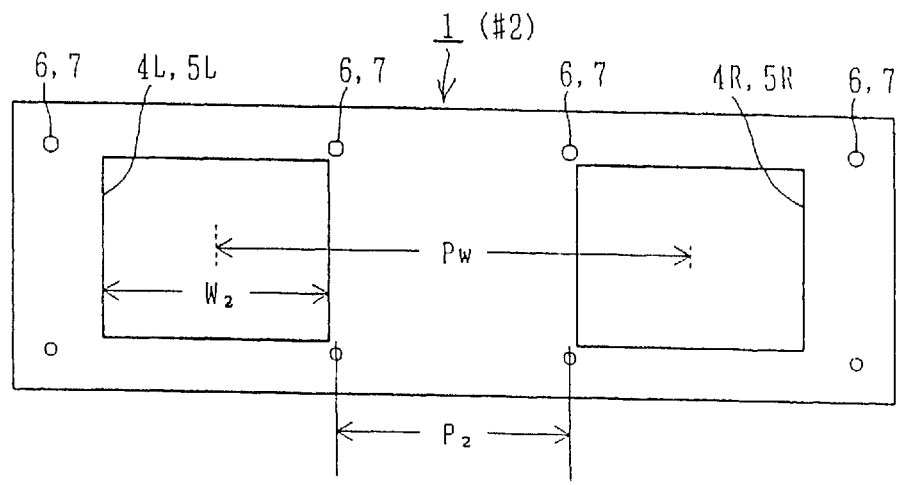
Figure 1D:
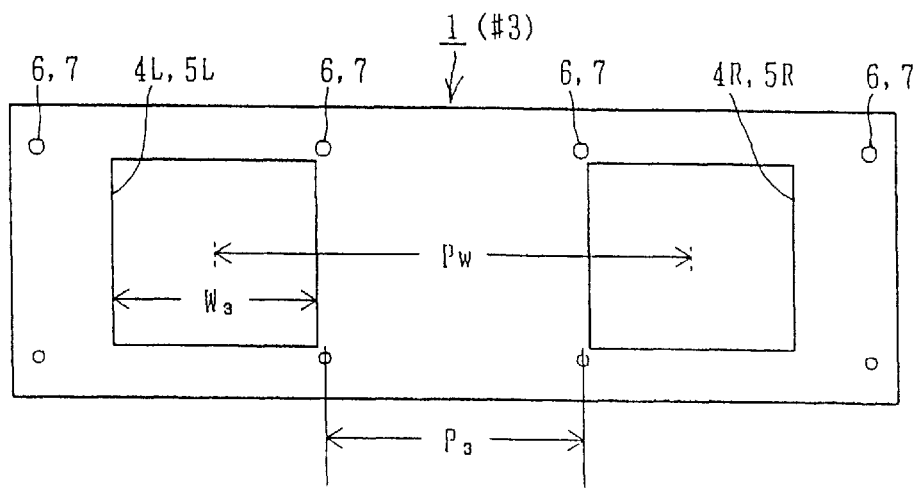

FIGS. 1a–d illustrate a set of stereo slide mounts. A mount system comprises plural types of stereo slide mounts 1 (#0 to #3) in which the profile shapes are the same and the widths W of the windows incrementally vary or gradually step wisely decrease. In FIGS. 1a–d, the widths W of the windows incrementally vary or step wisely increase or decrease very little from one increment or step to another. This increase or decrease is shown in an exaggerated manner, but the difference in width of the windows at each one step should in practice be very little. The number of steps from the maximum width of the window (for which the picture masking amount is smallest) (#0) to the minimum width of the window may not be limited to the four steps shown, but may be any desired number of steps.

The fundamental constitution of all of the types of stereo slide mounts 1 (#0 to #3) illustrated in FIGS. 1a–d are the same. The pitch Pw of the right and left windows is the same, and the mounting pitch of the widths W of the windows and right and left films are incrementally or step wisely different. The pitch Pw of the windows being the longitudinal distance between the center of each window. This longitudinal distance or pitch remains a constant despite the changing widths of the windows and the distances there between. The structure of the stereo slide mount 1 (#0) having the maximum width of window will be explained as an example.

Referring to FIGS. 2a–d and FIGS. 4a–d, the stereo slide mount 1 (#0) comprises a cover frame 2 and a base frame 3, formed by injection-molding a plastic or resin, and are provided with a pair of right and left windows 4R, 4L and 5R, 5L respectively. The windows 4R and 4L of the cover frame 2 and the windows 5R and 5L of the base frame 3 have vertical and lateral dimensions which are the same, and the pitch Pw between the right and left windows is set to be about 63.5 mm, being a standard value of the distance between two human eyes, or slightly narrower than that.

Referring to FIGS. 4a–d, studded cylindrical positioning pins 6 are positioned on the base frame 3 substantially at the four corners of the right and left windows 5R and 5L to engage perforations of the film. In the cover frame 2 shown in FIG. 3 pin holes 7 are provided at equivalent positions to the positioning pins 6 of the base frame 3. In FIG. 4c and 4d, a vertical groove 8 is formed at the center of the base frame 3 on the rear surface, and the base frame 3 can be folded at the vertical groove 8 which acts as a hinge.

The positional relationship of the positioning pins 6, pin holes 7 and the windows 4R, 4L and 5R, 5L of the stereo slide mount 1 is designed so that when a slide film photographed by a stereo camera is mounted on the stereo slide mount the perforations in the film fit over the pins 6 so that the slide film is in the required relative position on both the right and left. Referring to FIGS. 4a–d, when the perforations at the right and left ends of the top and bottom of the slide film F cut to a single frame unit are engaged with the four positioning pins 6 of the base frame 3, the positioning pins 6 and the pin holes 7 are positioned so that the inner vertical edges of the windows 5R and 5L are brought into agreement with the inner vertical edges of the pictures on the slide film F.

Referring to FIGS. 1a–d, the pitch Pw of the windows of all different types of the stereo slide mounts 1 are the same. The width ($W_0$, $W_1$, $W_2$, $W_3$) of the windows incrementally or step wisely change and the gap widths ($P_0$, $P_1$, $P_2$, $P_3$) between the two sets of right and left positioning pins 6 has the following relationship, where the gap width $P_0$ of the stereo slide mount 1 of (#0) is used as a reference.

(#0) $P_0$
(#1) $P_1 = P_0 + W_0 - W_1$
(#2) $P_2 = P_0 + W_0 - W_2$
(#3) $P_3 = P_0 + W_0 - W_3$

Therefore, in all the stereo slide mounts 1 (#0 to #3), the inner vertical sides of the right and left windows 4R, 4L and 5R, 5L are disposed in the same relative position with respect to the positioning pins 6, and in any stereo slide mount, the inner edges of the pictures of the slide film are brought into agreement with the inner edges of the windows 4R, 4L and 5R, 5L. In the stereo slide mounts having smaller width windows, the gap or width ($P_0$, $P_1$, $P_2$, $P_3$) between the two sets of right and left positioning pins 6 is increased to extend the pitch between the right and left films, and the outer masking amounts of the right and left films are therefore increased.

In mounting the stereo slide, use of the above-mentioned masking-amount guide device or other masking-amount deciding means known from the prior art makes it possible to determine the masking amount required for the film and to select the stereo slide mount 1 having a window of the width corresponding to the chosen masking amount. The film is fitted to the right and left windows 5R and 5L of the base frame 3, the cover frame 2 is mounted on the base frame 3, and the positioning pins 6 are engaged with the pin holes 7 to join the cover frame 2 to the base frame 3.

Since the base frame 3 can be folded at the vertical groove 8 which acts as a hinge, one half portion can be mounted before the other half portion, and the positioning pins 6 can be easily aligned with the pin holes 7, and hence the efficiency of the mounting operation is satisfactory. Since the surface of the cover frame 2 has no bending groove but is molded flatly, it is convenient to place any title or photographing memo on the cover frame 2.

Figure 5:
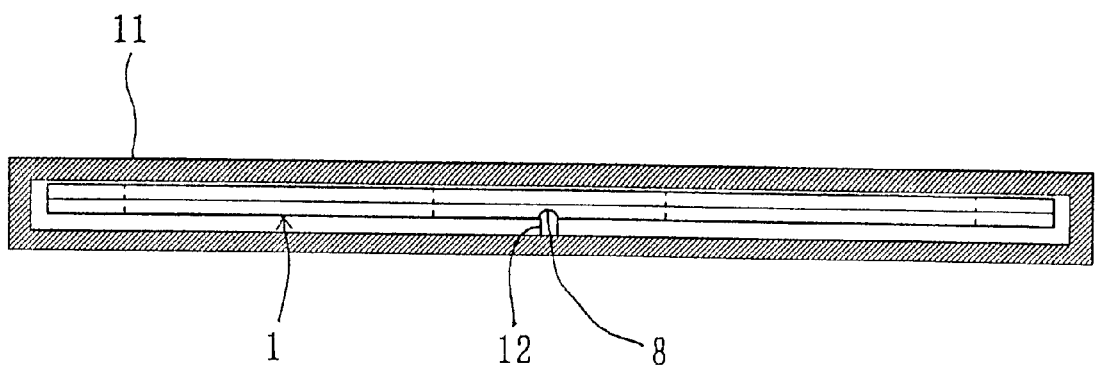
FIG. 5 is a diagram explaining positioning means by a leaf spring of a slide holder and a vertical groove of the stereo slide mount.

The conventional stereo slide viewer is formed so that the slide holder is slightly wider than the stereo slide mount to facilitate the loading of the stereo slide mount. The sideways or lateral positioning of the stereo slide mount is therefore unstable due to this difference in size. However, referring to FIG. 5, in an embodiment in accordance with one aspect of the invention, a positioning spring 12 is provided in the slide holder 11 of the slide viewer, and the positioning spring 12 is urged into the vertical groove 8 of the stereo slide mount 1. Then, the front and rear and right and left positions of the stereo slide mount 1 in the slide holder can be accurately positioned.

Figure 6:
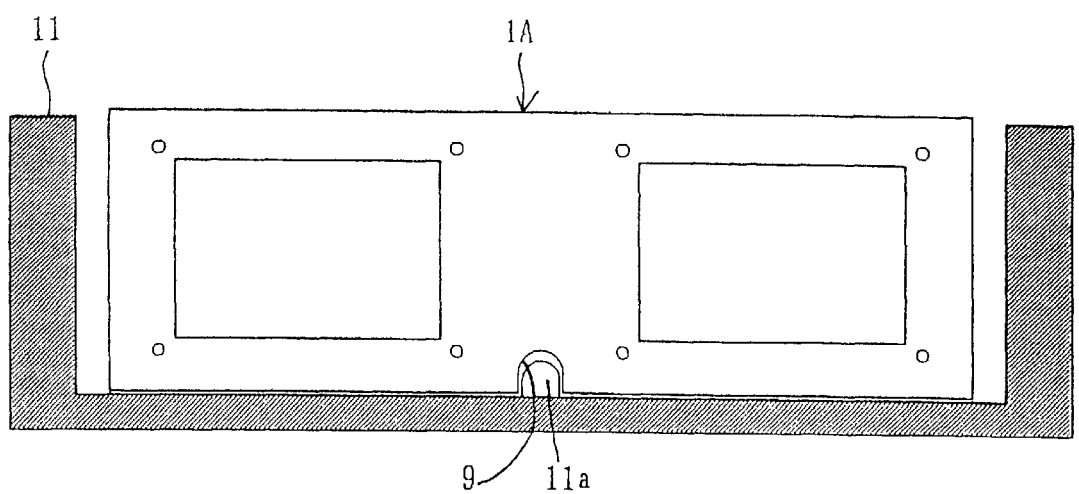
FIG. 6 illustrates another embodiment, and is a diagram explaining positioning means by a protrusion of the slide holder and a notch of the stereo slide mount.

FIG. 6 illustrates other positioning means. A notch 9 is molded at the center of the bottom edge of a stereo slide mount 1A. A protrusion 11*a* to be engaged with the notch 9 is provided on the slide holder 11 of the slide viewer so as to position the stereo slide mount 1A. As shown in FIG. 6, the upper end of the protrusion 11*a* is formed in a semi-circular shape. The stereo slide mount 1A is inserted from above in to the slide holder 11, and is smoothly engaged within the slide holder 11 when the notch 9 is engaged with the protrusion 11*a*. The height of the notch 9 is slightly greater than the height of the protrusion 11*a* so that the bottom of the stereo slide mount 1A does not float above the bottom of the slide holder 11. Another advantage of the notch 9, is that it is easy to distinguish between the top-and-bottom of the stereo slide mount 1A.

Figure 7:
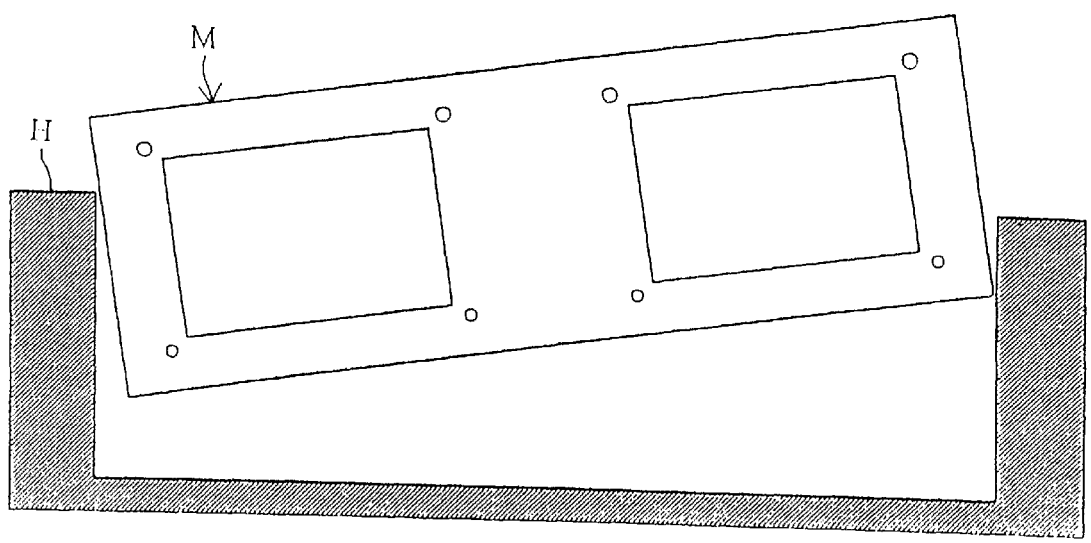
FIG. 7 is a diagram explaining the loading failure state of a prior art stereo slide mount.

As shown in FIG. 7, on inserting a conventional stereo slide mount into the slide holder of a stereo slide viewer, if the stereo slide mount is inclined to the right or left of the vertical, then frequently the stereo slide mount M may come into contact with both the right and left wall surfaces of the slide holder H. Therefore, it is impossible to insert the stereo slide mount M due to friction which locks it in place. Accordingly, the positioning means of the notch 9 and the protrusion 11*a* is provided and, as shown in FIG. 6, even if the slide holder 11 is considerably wider than the width of the stereo slide mount 1A, the lateral positional deviation of the stereo slide mount can be prevented so as to facilitate the insertion of the stereo slide mount.

Figure 8:
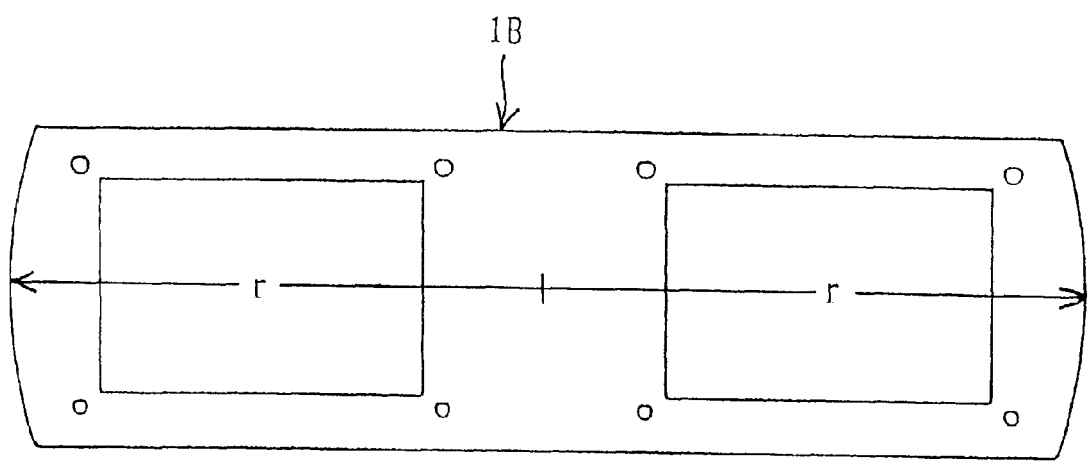
FIG. 8 is a front view showing another embodiment of the stereo slide mount.

Means for further facilitating the insertion of the stereo slide mount are shown in FIG. 8. Referring to FIG. 8, when both the right and left ends of the stereo slide mount 1B are formed in a circular or arc-shape having a radius r from the center of the stereo slide mount, then irrespective of the inclining angle when the stereo slide mount 1B is inserted into the slide holder 11 the stereo slide mount 1B will not be locked in position when only partly inserted, but can be smoothly inserted. Since the lateral width of the bottom side of the stereo slide mount 1B is considerably shorter than the lateral width of the slide holder, the aligning of both the slide holder and the stereo slide mount 1B at the time of inserting is extremely easy, as illustrated in FIG. 9.

Figure 10:
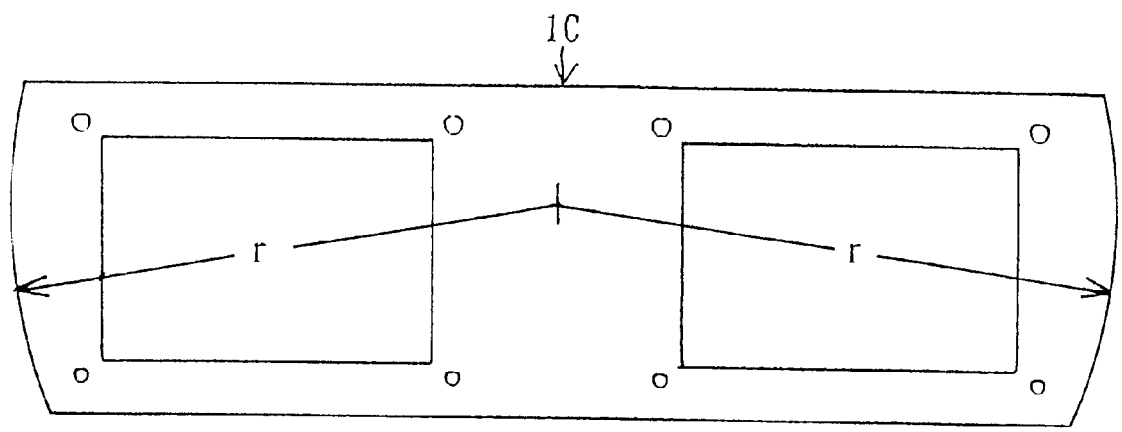
FIG. 10 is a front view showing still another embodiment of the stereo slide mount.

FIG. 10 illustrates still another embodiment. This stereo slide mount 1C is formed by displacing the center of the radius r upward from that of the stereo slide mount 1B of FIG. 8, and has the same operation and effect as the stereo slide mount 1B of FIG. 8.

Figure 9:
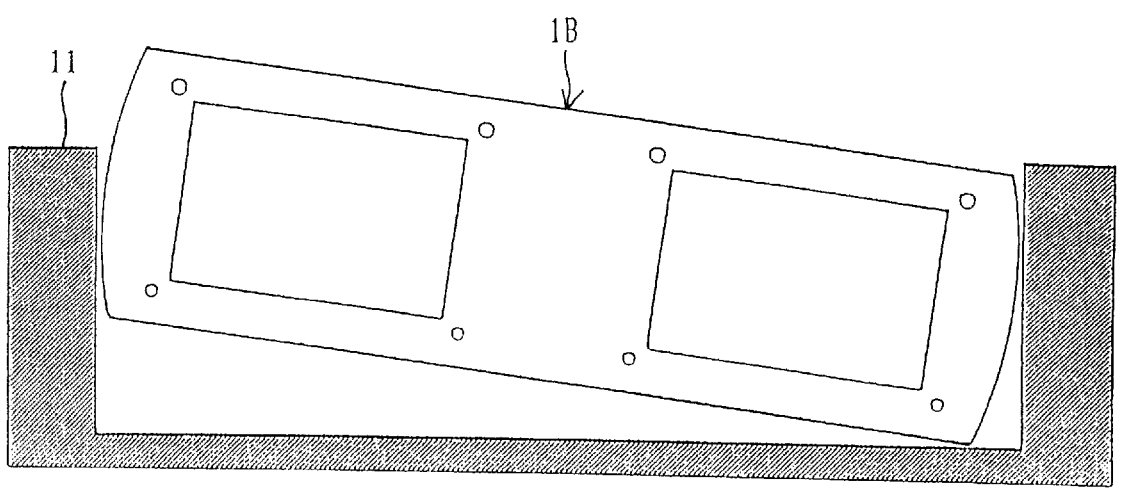
FIG. 9 is a diagram explaining the state at the time of loading the stereo slide mount of FIG. 8.

The stereo slide mounts 1B, 1C illustrated in FIGS. 8 to 10, can be extremely easily inserted into the slide holder. Hence, the inner width of the slide holder 11 may be nearly equal to the full width of the stereo slide mounts 1B or 1C so as to eliminate the lateral gap and enable the stereo slide mounts 1B or 1C to be accurately positioned without providing special positioning means.

An auto-loading type slide projector used for loading many stereo slide mounts in a magazine might cause a loading failure accident due to locking or jamming of the conventional stereo slide mount M as shown in FIG. 7 during auto-loading. However, the sides of the stereo slide mounts illustrated in FIGS. 8 to 10 are formed in the above-mentioned circular or arc-shapes so as to prevent such an accidental loading failure, thereby remarkably improving operating stability.

Figure 11:
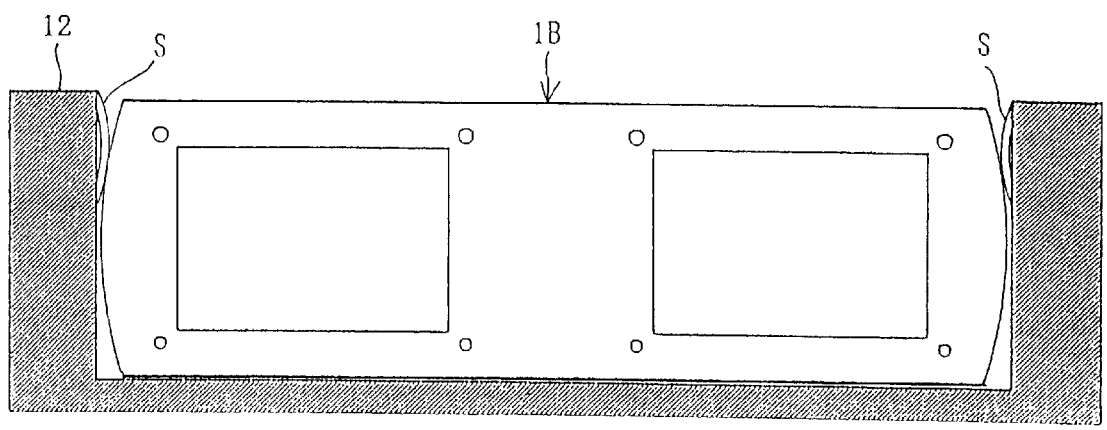
FIG. 11 is a diagram illustrating the state in which the stereo slide mount of FIG. 8 is loaded into a slide magazine.

Most slide projector magazines have leaf springs which engage with both ends of the stereo slide mount so as to hold the stereo slide mount. However, in preferred embodiments of the present invention in which both the ends of the stereo slide mount are formed in a circular or arc-shape as shown in FIG. 11, the stereo slide mount 1B is urged toward the bottom of the slide holder 12 of the magazine by a leaf spring S and is thus securely and stably held, preventing the stereo slide mount from being dropped while transporting the magazine.

As described above, the stereo slide mount system of the present invention allows proper selection of a stereo slide mount on which the film having a picture width determined by a picture masking amount guide device is mounted. Then, the parallax of the subject can be accurately corrected, and even if the widths of the windows holding the pictures are different, the pitch between the right and left pictures will always be the same. Accordingly, even when stereo slide mounts having different picture masking amounts are frequently replaced and viewed, the optical angles of the right and left eyes will remain constant, and therefore fatigue of the eye will be reduced.

The present invention is in no way limited to the above-mentioned embodiments only, but can be modified in a variety of ways within the technical scope of the invention, and it should be noted that the present invention encompasses such modified. embodiments, as a matter of course.

What is claimed is:

1. A readily insertable and removable unitary stereo slide mount for facilitating insertion in a stereo slide holder without disassembling the stereo slide holder, said stereo slide mount engaging film with a picture thereon for viewing an image of the picture in stereo, said stereo slide mount having parallel longitudinal edges and right and left lateral ends formed in a circular arc shape having a radius from a point located centrally of the stereo slide mount in the right and left direction, whereby a loading failure resulting in locking or jamming due to insertion of said stereo slide mount at an inclining angle is prevented.

2. A stereo slide mount as claimed in claim 1, wherein:

said radius is from a point displaced upwards from the center of the stereo slide mount.

3. A readily insertable and removable unitary stereo slide mount for facilitating insertion in a stereo slide holder without disassembling the stereo slide holder, said stereo slide mount engaging film with a picture thereon for viewing an image of the picture in stereo, said stereo slide mount having parallel longitudinal edges and right and left lateral ends having a right and a left window between the right and left lateral ends, the right and left lateral ends each formed in a curved shape, whereby a loading failure resulting in locking or jamming due to insertion of said stereo slide mount at an inclining angle is prevented.

4. A stereo slide mount as in claim 3 wherein:

the curved shape is arcuate having the center of a radius for the curved shape placed substantially at the center of the slide mount.

5. A stereo slide mount as in claim 3 wherein:

the curved shape is arcuate having the center of a radius for the curved shape displaced laterally from the center of the slide mount.

6. A readily insertable and removable unitary stereo slide mount for facilitating insertion in a stereo slide holder without disassembling the stereo slide holder and for positioning and viewing a first and second film having a picture thereon comprising:

- a base frame having parallel longitudinal edges and left and right curved lateral ends;
- a cover frame placed over said base frame;
- a base frame left and right window formed in said base frame, said base frame left and right windows separated by a pitch;
- a cover frame left and right window formed in said cover frame, said cover frame left and right window separated by the pitch and positioned adjacent said base frame left and right windows;
- a plurality of pins formed on said base frame, one each of said plurality of pins positioned adjacent a corner of said base frame left and right windows and to engage the first and second film; and
- a plurality of pin holes formed in said cover frame corresponding to said plurality of pins,
- whereby the left and right curved lateral ends facilitate insertion of the slide mount into the stereo slide holder.

7. A stereo slide mount as in claim 6 wherein:

the left and right curved lateral ends are arcuate having the center of a radius for the left and right curved lateral ends placed substantially at the center of the slide mount.

8. A stereo slide mount as in claim 6 wherein:

the left and right curved lateral ends are arcuate having the center of a radius for the left and right curved lateral ends displaced laterally from the center of the slide mount.

* * * * *